United States Patent
Guzman et al.

[19]

[11] Patent Number: 6,047,385
[45] Date of Patent: Apr. 4, 2000

[54] DIGITAL CROSS-CONNECT SYSTEM RESTORATION TECHNIQUE

[75] Inventors: Richard L. Guzman, Holmdel, N.J.; Ihor J. B. Wynarczuk, Carol Stream, Ill.

[73] Assignee: AT&T Corp, New York, N.Y.

[21] Appl. No.: 08/926,614

[22] Filed: Sep. 10, 1997

[51] Int. Cl.$^7$ .................................. C06F 13/00
[52] U.S. Cl. ................................................ 714/4
[58] Field of Search ........................ 714/4, 3, 2

[56] References Cited

U.S. PATENT DOCUMENTS

| | | | |
|---|---|---|---|
| 5,138,657 | 8/1992 | Colton et al. | 379/220 |
| 5,197,069 | 3/1993 | Cook et al. | 371/7 |
| 5,222,128 | 6/1993 | Daly et al. | 379/221 |
| 5,420,917 | 5/1995 | Guzman | 379/279 |
| 5,444,693 | 8/1995 | Arslan et al. | 370/16 |
| 5,623,481 | 4/1997 | Russ et al. | 370/225 |
| 5,761,412 | 6/1998 | Higgins | 395/184.01 |
| 5,781,537 | 7/1998 | Ramaswami et al. | 370/254 |
| 5,781,912 | 7/1998 | Demers et al. | 707/202 |
| 5,796,718 | 8/1998 | Caterisano | 370/217 |
| 5,859,959 | 1/1999 | Kimball et al. | 395/182.02 |

OTHER PUBLICATIONS

Rosenthal, P.H., "Business resumption planning: exercising the disaster management team", Jun. 1993, Journal of Sys Mgmnt, v44, n6, pp. 12 etseq.

R.F. Ray, *Engineering and Operations in the Bell Sys.*, 2$^{nd}$ ed., Telecommunications in the Bell System, 1982, AT&T Bell Labs., Murray Hill, NJ, pp. 605–611, 1982.

Okanare et al., "Integrated Self–Healing Techniques for SONET Survivability" NEC Research and Development, vol. 33, Issue 4, pp. 655–668, Oct. 1992.

*Primary Examiner*—Norman Michael Wright
*Attorney, Agent, or Firm*—Robert B. Levy

[57] ABSTRACT

Full restoration of a telecommunications network element (12), such as a digital cross-connect system (DCS), is accomplished by receiving from each element provisioning updates as they occur in real time via a local controller network (18). The provisioning changes are stored, typically via a local controller library (20). A DCS-OSS data base (22) creates and stores restoration maps for each DCS and, in response to updates from the local controller library 20, the DCS-OSS data base updates the stored restoration maps. Should a DCS become inoperative, that DCS can be restored (either by itself, or on another DCS) using the restoration map. Since the map contains the most up-to-date data, full restoration can be readily achieved.

10 Claims, 2 Drawing Sheets

DIGITAL CROSS-CONNECT SYSTEM RESTORATION TECHNIQUE

TECHNICAL FIELD

This invention relates to a method and apparatus for accomplishing restoration of one or more inoperative digital cross-connect systems in a telecommunications network, either because of a failure due to a disaster or a planned maintenance operation.

BACKGROUND ART

Most present-day telecommunications networks typically include one or more Digital Cross-Connect Systems (DCSs) for electronically cross-connecting various incoming trunks to selected outgoing trunks in much the same way as a telecommunications switching system. However, with a DCS, the connections are set up in advance of the call, and typically remain in place thereafter. In contrast, a switching system sets up a connection on a call-by-call basis and then tears down the connection once the call is completed. As with other types of telecommunications equipment, each DCS is manufactured to achieve high reliability under adverse conditions. However, a disaster, such as a fire, flood, earthquake or explosion can render a DCS inoperable, disrupting telecommunications service. Moreover, during certain types of maintenance operations, a telecommunications service provider may purposely remove a DCS from service. Restoration of service requires that the cross-connections be restored, either by restoration of DCS itself, or by replicating the cross-connections on another DCS.

Restoration of the DCS cross-connections is usually a time-consuming operation. In the event of a disaster, spare DCS capacity may no longer exist on site. Under such circumstances, one or more restoration DCSs must be transported to the disaster site. Thereafter, technicians must replicate the cross-connections on the restorations DCSs.

U.S. Pat. No. 5,420,917, "Automated Recovery of Telecommunications Network Elements", issued on May 30, 1995, in the name of Richard Guzman, and assigned to AT&T Corp., the assignee of the present invention, describes a method for automated restoration of one or more inoperative DCSs in a telecommunications network. In accordance with the teachings of the '917 patent (herein incorporated by reference), restoration of a plurality of inoperative DCS is accomplished by first connecting a plurality of restoration DCS through guided media, in the form of cables, radio channels or the like, to the inoperative DCS. Thereafter, the profile of each inoperative DCS ( i.e., its cross-connection data) is obtained from a network data base, referred to as the DCS Operation Support System (DCS-OSS). A technician then translates the cross-connections needed to restore the each inoperative DCS into a circuit map in accordance with the cross-connect capability of each restoration DCS. The circuit map is ported to the restoration DCSs and is thereafter executed by such DCSs to restore service.

While the restoration technique disclosed in the '917 patent is effective, the technique nevertheless suffers from the drawback that the profile of each inoperative DCS may not always be accurate. In practice, the profile for each inoperative DCS is obtained by periodically reconnoitering that DCS. Depending on the traffic it carries and its location, a DCS may only be reconnoitered as often as every six months. Between such six month intervals, a telecommunications network service provider will likely re-provision a DCS to alter its cross-connections to add, remove or modify service. Hence, there is a significant likelihood that the stored profile for a given DCS will not include such recent provisioning information. Hence, that restoration of a DCS using its stored profile often will not result in a complete restoration of all service.

Thus, there is a need for a restoration technique that provides for complete restoration of an inoperative DCS.

BRIEF SUMMARY OF THE INVENTION

In accordance with the invention, a technique is provided for achieving automatic restoration of at least one of a plurality of network elements, such as digital cross-connect systems (DCSs), in a telecommunications network upon one or more such elements becoming inoperative. The technique is practiced by receiving from each element an update of any configuration change made to that element in real time and thereafter storing each such change. Thus, for example, if the element comprises a DCS and a new provisioning change has been made thereto, that change is communicated in real time, typically via a local controller network, for storage in a local controller library (e.g., data base). For each network element, such as a DCS, a restoration map is created and updated in response to each provisioning update received for that element. In this way, the restoration map contains the most recent configuration information for the element, such as the most recent cross-connect information for a DCS.

Should a network element become inoperative, as a result of a disaster or planned maintenance operation, the restoration map for that inoperative element is retrieved. The retrieved restoration map is used to restore service, either by restoring service on that element itself, or replicating its functionality on anther element. For example, if the inoperative element is a DCS that itself be restored, then the configuration map is used to re-establish the cross-connections on the previously inoperative DCS. If the DCS cannot be restored, the restoration map is utilized to replicate the functionality (cross-connections) on a restoration DCS.

DETAILED DESCRIPTION

Figure 1:
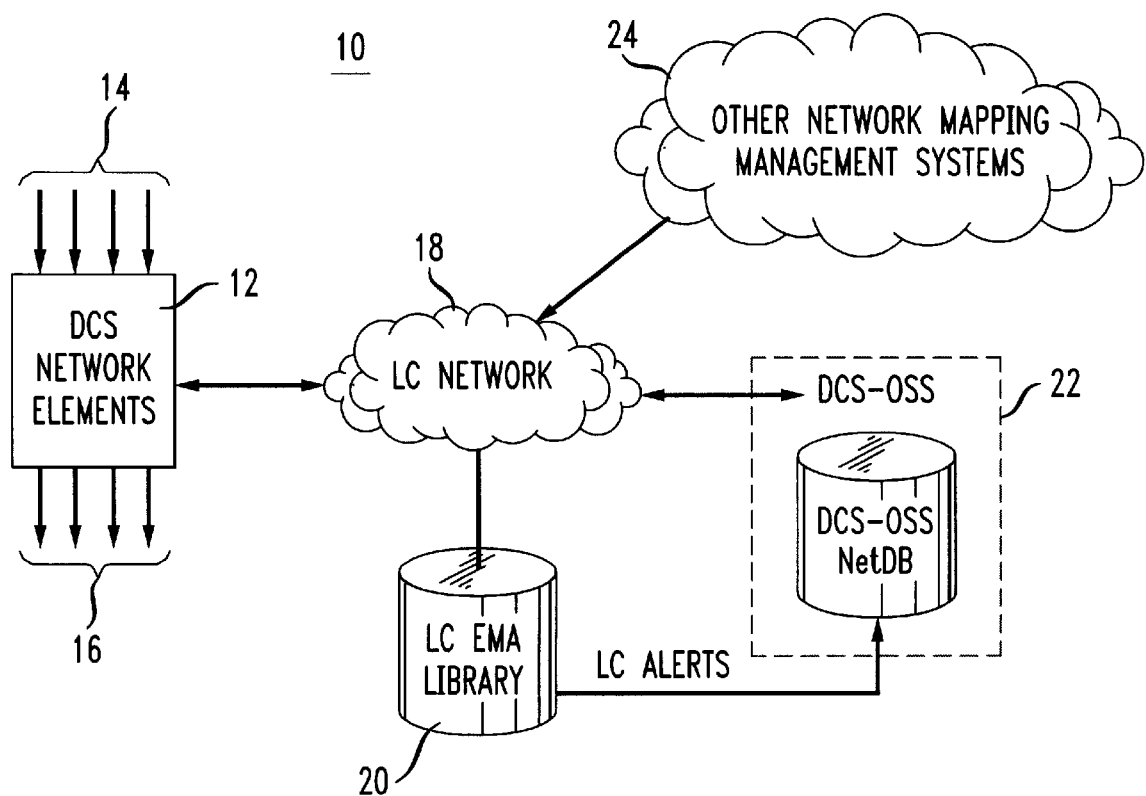
FIG. 1 is a block schematic diagram of a portion of a telecommunications network depicting the restoration technique of the invention.

FIG. 1 illustrates a block schematic diagram of a portion of a telecommunications network 10 that includes at least one network element 12. In the illustrative embodiment, the element 12 comprises Digital Cross-connect system (DCS) known in the art. The DCS 12 provide cross-connections (circuits) between selected ones of the trunks 14 and 16. These trunks may carry DS 1, sub DS 1, Intermediate Bit Rate, sub-rate, 2-point and multi-point circuits.

In accordance with the invention, a Local Controller (LC) network 18, such as a LAN, couples the DCS 12 to a Local Controller Electronic Message Alert (LCEMA) Library (e.g., storage facility), which in turn, is connected to a DCS Operation Support System (DCS-OSS) 22, typically taking the form of a data base or the like. The LC 18 network receives each provisioning update made to the DCS 12 in real time and thereafter supplies that provisioning update to the LCEMA library 20. (Under some circumstances, the LC network 18 could provide the provisioning updates directly to the DCS-OSS data base 22 rather than store such information in the LC EMA library 20.)

In practice, the telecommunication network service provider responsible for the DCS 12 will provision it by modifying the cross-connections to add, delete or modify service for one or more subscribers. Thus, as each provisioning change is made to the DCS 12, the LC network 18 communicates that change to the LC EMA library 20. The LC EMA library 20 provides the provisioning updates (depicted as LC Alerts in FIG. 1) to the DCS-OSS data base 22. As described in U.S. Pat. No. 5,420,917 (herein incorporated by reference), the DCS-OSS data base 22 creates and stores maps. Each map represents configuration information descriptive of the cross-connections (circuits) provided by each DCS, such as DCS 12. In response to a provisioning update received from the LC EMA library 20, the DCS-OSS data base 22 will update the map for the corresponding DCS. Additionally, the DCS-OSS data base 22 may also receive updates about a particular DCS from the LC EMA library 22 in response to information received through the LC network 18 from other network mapping and management systems 24.

In the past, the DCS-OSS data base 22 obtained the circuit map for a particular DCS by periodically reconnoitering that DCS to obtain its cross-connection information. However, such reconnoitering occurred infrequently, usually not more often than every six months. Thus, in the past, provisioning changes made between reconnoitering intervals were not normally made available to the DCS-OSS data base 22. Hence, reliance on the circuit information obtained only through reconnoitering each DCS was often insufficient to fully restore service.

However, the LC network 18 and LC EMA library 20 of the invention assure that the DCS-OSS data base 22 always contains the most up-to-date information about each DCS, such as DCS 12. As discussed above, the LC network 18 and LC EMA library 20 cooperate to provide the DCS-OSS data base 22 with real-time provisioning changes as each change has been made to each DCS (or other network elements). Thus, should a DCS, such as DCS 12, become inoperative, either because of a disaster, or because of planned maintenance, the DCS-OSS data base 22 can readily provide the most up-to-date map of the DCS cross-connects for restoration purposes. In this way, full service restoration can be achieved, even with regard to provisioning changes made very shortly before the element became inoperative.

Figure 2:
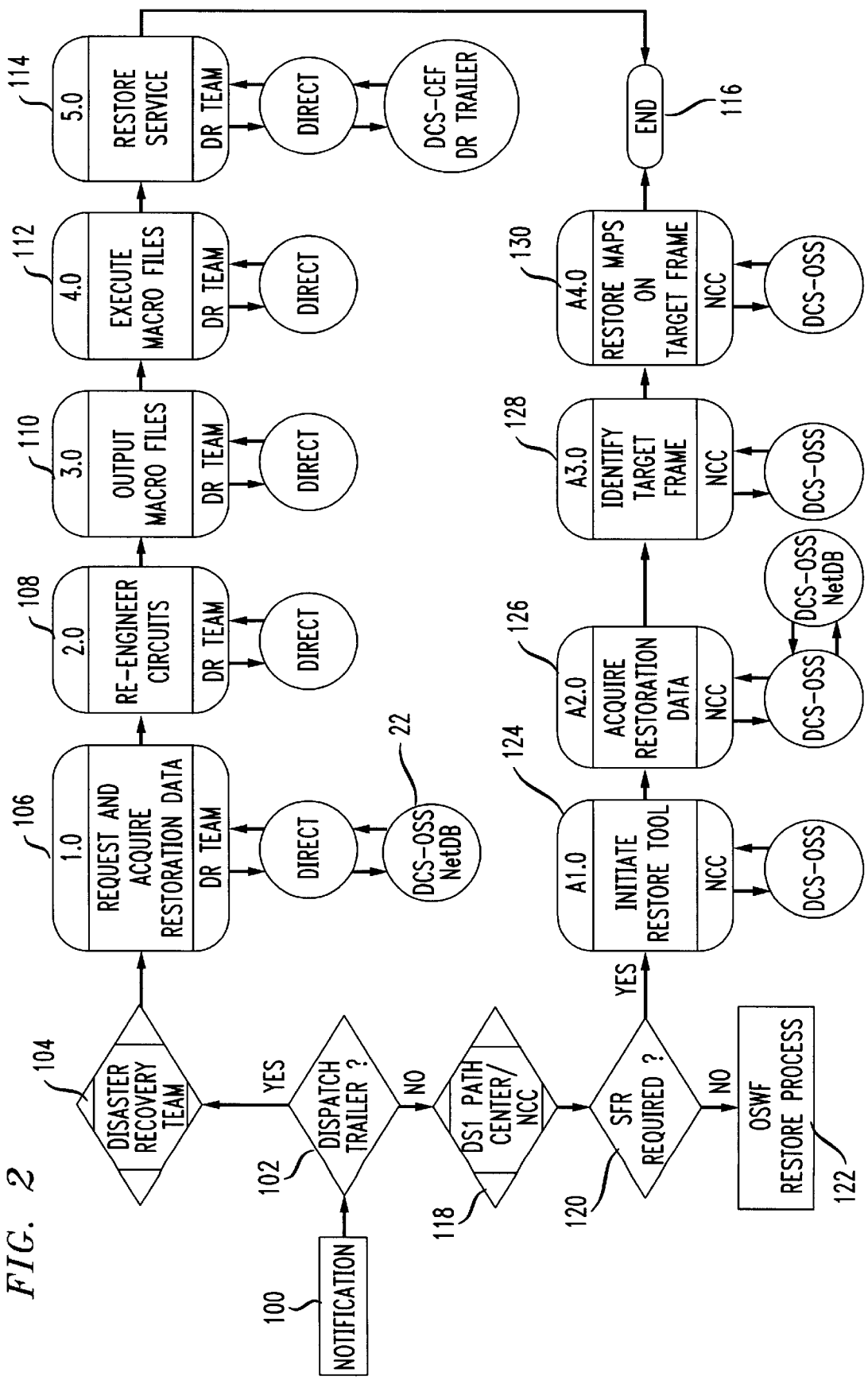
FIG. 2 is a block schematic diagram of a flow chart showing the steps associated with the restoration technique of the invention.

FIG. 2 illustrates a flow chart of a method, in accordance with another aspect of the invention, for restoring service previously provided by a inoperative network element, such as DCS 12 of FIG. 1. The service restoration method of FIG. 2 becomes active upon a notification (step 100) of an inoperative DCS, either as a result of a disaster or planned maintenance. Following step 100, a determination is made (step 102) whether there is more than one inoperative DCS. If upon the failure of one than one DCS, it is usually necessary to provide several restorations DCSs, thereby necessitating dispatch of a disaster recovery trailer (not shown) of the type described in the aforementioned '917 patent. Upon dispatch of the disaster recovery trailer, a disaster recovery team is assembled (step 104). Following formation of the team, one or more technicians on that team next request and thereafter acquire (step 106) the necessary restoration data for each inoperative DCS, such as DCS 12 of FIG. 1. In practice, the restoration data is obtained from the DCS-OSS date base 22 via a software tool known as Disaster Intelligent Recovery Engineering Connection Technology (DIRECT). DIRECT is a disaster recovery tool for a switching office in the face of a prolonged outage (due to natural or man-made disasters). The DIRECT tool combines careful planning on office capacity with detailed reconfiguration of the office needs in an automated way so that reconnection maps for the different variety DCSs will be generated timely to support the recovery process. One of the key factors, the reconnection maps for the restoration DCSs supporting DS0 processing, relies on the DCS-OSS database to obtain the internal cross connection maps for each DCS. These cross connection maps are used as input to DIRECT to figure out the traces of the traffic that flows through the switching office. Based on the traces, the DIRECT tool recreates the traffic mappings on the restoration DCSs and then generates command tapes for the restoration DCSs assigned to the disaster site.

After acquiring the restoration date from the DCS-OSS date base 22 for each inoperative DCS, one or more technicians on the team then re-engineer (i.e., adapt) the circuits (cross-connects) of the restoration DCSs (step 108) in a way so that the restoration DCSs can replicate the service previously provided by the inoperative DCSs. Such re-engineering is performed during step 108 using the DIRECT tool. The re-engineering effort yields a set of Output Macro Files (step 110), typically produced using the DIRECT tool. The Output Macro Files are executed (step 112), using the DIRECT tool to establish the needed service (step 114) on the restoration DCSs associated with the restoration trailer. The process ends (step 116) upon restoration of the service.

As discussed above, steps 104–114 are executed to restore service, via the restoration trailer, in the event there exist multiple failed DCSs. In accordance with another aspect of the invention, a slightly different approach may be employed to restore a single inoperative DCS. If, following step 102, a determination is made that one DCS (i.e., a single "frame") is inoperative, then step 118 is executed and personnel at a Network Control center (NCC) now assume responsibility for service restoration. In practice, most telecommunication carriers, such as AT&T, maintain limited spare DCS facilities at their network control centers. Thus, it is possible if a single DCS, such as DCS 12 of FIG. 1 has become inoperative, service can be restored on a restoration frame in the NCC. However, if there are multiple inoperative DCSs as a result of a disaster, the NCC may not possess sufficient restoration capacity, hence the need to dispatch a restoration trailer.

Following step 118, a technician determines whether the single failed DCS can itself be restored (step 120). In some instances, an inoperative DCS can be restored by simply re-booting the DCS with a map of its past cross-connections. If such is the case then, the On-Site-Work Force (OSWF) where the inoperative DCS is located performs such a re-boot, using media, such as a magnetic tape, disc or flash memory, containing the DCS cross-connect information. It may not always be possible to restore service on the failed DCS. Thus, if the technician determines during step 120 that the failed DCS cannot itself be restored, then a restoration tool, such as RESTORE, is obtained from the DCS-OSS 22 (FIG. 1) for subsequent execution (step 124). The RESTORE tool extracts mapping data (i.e., cross-connect information) for the inoperative DCS system, (e.g., DEC 12 of FIG. 1). The RESTORE tool processes the mapping data for porting to the failed element itself, or to another like element at a network control center, or to a personal computer (not shown) for insertion as a macro file into a DCS at any location, such as the restoration trailer. Following execution of the restoration tool, the restoration map needed for the inoperative DCS is obtained from the (step 126) in order to create a circuit map for use on a restoration DCS. Thereafter, a target restoration DCS (i.e., a DCS having available restoration capacity) is identified within the NCC. Finally, service is restored (step 130) on the target restoration DCS using the map created for that restoration DCS. Following step 130, the process ends (step 116).

The restoration process described with respect to FIG. 2 affords the advantage of differentiating between the circumstance where there are multiple inoperative DCSs versus a single inoperative DCS. As discussed with respect to steps 118–130, a single inoperative DCS can be restored itself or on a restoration DCS in a network control center without the need to dispatch a equipment on site, saving time and expense. Advantageously, restoration of a single DCS in accordance with the invention, is accomplished with the use of a restoration map that contains the most up-to-date provisioning information, thus allowing for complete restoration.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for achieving automatic restoration of at least one of a plurality of network elements in a telecommunications network upon the occurrence of a disaster, comprising the steps of:

receiving from each network element an update indicative of a configuration change to said each network element as said change occurs;

storing said updates;

maintaining a restoration map of said each network element and updating said map in accordance with stored updates, if any, corresponding to said each network element;

retrieving said restoration map for said each network element upon said element becoming element inoperative; and employing the restoration map to restore service previously provided by said each network element.

2. The method according to claim 1 wherein the restoration map is employed to restore service via a restoration element.

3. The method according to claim 2 wherein said employing step further includes the step of dispatching to said inoperative network element a restoration element on which service is restored via said restoration map.

4. The method according to claim 1 wherein the restoration map is employed to restore service on the inoperative element itself.

5. The method according to claim 2 wherein said restoration element on which service is restored is located at a Network Control Center.

6. A method for achieving automatic restoration of at least one of a plurality of network elements in a telecommunications network upon the occurrence of a disaster, comprising the steps of:

receiving from each network element an update indicative of a configuration change to said each network element as said change occurs;

storing said updates;

maintaining a restoration map of said each network element and updating said map in accordance with stored updates, if any, corresponding to said each network element;

determining if more than one element is in operative, and if so then dispatching restoration elements to said inoperative elements;

retrieving said restoration map for said each network element upon said element becoming element inoperative; and employing the restoration map to restore service previously provided by said each network element on said restoration elements dispatched to said inoperative elements.

7. The method according to claim 6 wherein the step of employing the restoration map includes the steps of;

re-engineering said dispatched elements in accordance with the restoration map;

producing a set of macro files; and executing the macro files to restore service.

8. A method for achieving automatic restoration of an inoperative network element in a telecommunications network upon the occurrence of a disaster, comprising the steps of:

receiving from said network element an update indicative of a configuration change to said network element as said change occurs;

storing said updates;

maintaining a restoration map of said network element and updating said map in accordance with stored updates, if any, corresponding to said network element;

upon said element becoming inoperative, determining if service can be restored on said inoperative element, and if so, then employing said restoration map to provide service, otherwise retrieving said restoration map for said network element;

identifying a restoration element at an off-site location; and employing the restoration map to restore service previously provided by said network element on said restoration element.

9. In combination with a telecommunications network including at least one element that may be re-provisioned, a system for facilitating restoration of said element, comprising:

a local controller network coupled to said element for receiving therefrom information representing provisioning changes made to said element as such changes are made;

a local controller library for storing said information representing said provisioning changes made to said element; and an element operations support system for creating and storing a configuration map of said element, said support system being responsive to said local controller library for receiving said information representing provisioning updates for updating said configuration map in accordance with said information received from said local controller library to enable restoration of said element using said configuration map.

10. The system according to claim 9 wherein the element comprises a digital cross-connect system (DCS) and wherein the network operation support system comprises a DCS Operation Support System.

* * * * *